(12) United States Patent
Hu et al.

(10) Patent No.: US 9,064,055 B2
(45) Date of Patent: Jun. 23, 2015

(54) SOFTWARE DEVELOPMENT ASSISTANT METHOD AND SYSTEM

(75) Inventors: Xiao Wei Hu, Beijing (CN); Xia Zhang, Beijing (CN); Dan Han, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 13/191,429

(22) Filed: Jul. 26, 2011

(65) Prior Publication Data
US 2012/0030658 A1 Feb. 2, 2012

(30) Foreign Application Priority Data
Jul. 30, 2010 (CN) .......................... 2010 1 0244497

(51) Int. Cl.
*G06F 9/44* (2006.01)
*G06F 11/36* (2006.01)

(52) U.S. Cl.
CPC ................................ *G06F 11/3688* (2013.01)

(58) Field of Classification Search
CPC .................................................. G06F 11/3688
USPC ............... 717/124–154, 168–178; 714/37–39
See application file for complete search history.

(56) References Cited

U.S. PATENT DOCUMENTS

| | | | |
|---|---|---|---|
| 6,907,546 B1 * | 6/2005 | Haswell et al. ............ | 714/38.11 |
| 7,334,005 B2 | 2/2008 | Sobel | |
| 2002/0087668 A1 | 7/2002 | San Martin et al. | |
| 2002/0188674 A1 * | 12/2002 | Brown et al. ................. | 709/203 |
| 2005/0114838 A1 * | 5/2005 | Stobie et al. .................. | 717/124 |
| 2005/0177825 A1 | 8/2005 | Kamalanathan | |
| 2005/0193269 A1 * | 9/2005 | Haswell et al. ................. | 714/38 |
| 2006/0101450 A1 | 5/2006 | Datta et al. | |
| 2008/0126880 A1 * | 5/2008 | Hegarty et al. ................. | 714/46 |
| 2009/0199160 A1 * | 8/2009 | Vaitheeswaran et al. ..... | 717/124 |
| 2009/0210870 A1 | 8/2009 | Clark et al. | |
| 2010/0058313 A1 | 3/2010 | Hansmann et al. | |
| 2010/0070962 A1 | 3/2010 | Sinn et al. | |
| 2010/0083246 A1 | 4/2010 | Mincarelli et al. | |

OTHER PUBLICATIONS

Denaro et al., Early Performance Testing of Distributed Software Applications, 2004 ACM, pp. 94-103.*
Dalai et al., Model-Based Testing in Practice, 1999 ACM, pp. 285-294.*
Bai et al., WSDL-Based Automatic Test Case Generation for Web Services Testing, 2005 IEEE, pp. 1-6.*

* cited by examiner

*Primary Examiner* — Satish Rampuria
(74) *Attorney, Agent, or Firm* — CRGO Law; Steven M. Greenberg, Esq.

(57) ABSTRACT

The present invention provides a software development method, system and computer program product. Generally, a computer program product for software development assistance includes a computer readable storage medium having computer readable program code embodied therewith such that the computer readable program receives from a server over a computer communications network both a software update for software installed in an end user device, and also test cases and a testing tool. The test cases are loaded in memory of the end user device and executed in the end user device with the execution tool with respect to the software update. Execution information produced by the execution of the test cases is collected and transmitted back to the server from the end user device. Optionally, a new test case for the software update can be created within the memory of the end user device the new test case can be executed along with the received test cases with the execution tool in the end user device. Consequently, the new test case can be transmitted to the server along with the collected execution information.

16 Claims, 5 Drawing Sheets

SOFTWARE DEVELOPMENT ASSISTANT METHOD AND SYSTEM

CROSS-REFERENCE TO RELATED APPLICATIONS

This application claims priority under 35 U.S.C. §119(a) to Chinese Patent Application Serial Number 201010244497.3, filed Jul. 30, 2010, entitled "SOFTWARE DEVELOPMENT ASSISTANCE METHOD AND SYSTEM", the entirety of which is incorporated herein by reference.

TECHNICAL FIELD

The invention generally relates to data processing technology, in particular, to a software development assistant method and system.

TECHNICAL BACKGROUND

Modern software is continuously developed and used in computers and other machines that critically affect the lives of people including software for automatic teller machines (ATMs), automobiles and the like. For these machines, the software must be both secure and also reliable. However, it is common for the end user to identify defects in software after the software has been released. Once defects are found in software, the software developer should fix the defects right away. In this regard, usually, the software developer fixes defects in its software by releasing "patches".

In addition to defect detection and remediation, software also should be continuously improved to adapt the software to newly emerging functions and technologies. Therefore, many software developers, in order to satisfy increasing functional demands of the end user base, upgrade fielded software by releasing patches after the software has been released. Of note, patches may either be used to provide new functions or be used to provide improved functions.

During software development, the software developer often uses automatic test cases to test developed software. Automatic test cases are programs implemented with script and representing certain function in software, that can be executed by a corresponding automatic execution tool to identify success or failure of execution of pre-defined test cases and record information required for disclosing defect and debugging problems of software. Although software developers can find most of defects in software during software development stage through such automated testing and make improvements thereupon, there may remain defects undiscovered.

It has been noted that since different end users focus upon different aspects in software usage, defects in software can be found more easily through the use of the software by the end user. Therefore, collecting end user feedback is an important software debugging tool in that a software developer can determine defects in software by collecting feedback to problems encountered during software usage from different users, so as to further develop patches for fixing the defects. However, such collection of feedback is both time-consuming and labor intensive, and the manner in which software developers and end users communicate generally is not intuitive. In particular, to replicate an end user reported defect, the software developer first must imitate the computing environment of the end user and the operation steps performed by the end user as specified by some subjective description of the end user.

It is ironic, as well, that while software patches may correct software defects, the software patch itself may contain one or more defects. Thus, the automatic deployment of a software patch to end users can be risky for machines that require security and reliability. Therefore, it is desirable to selectively and automatically deploy a software patch to user devices to prevent all user devices from being exposed to potential danger caused by a defective software patch.

SUMMARY OF THE INVENTION

In view of the above problems, the invention provides a software development assistant method and system to assist development, fix and improvement of software and automatic deployment of software update according to software usage condition collected from users that is based on shared test case. Here, software patch developed by a software developer for fixing its released software or software patch developed for providing new functions for the released software are all collectively referred to as software update.

According to one aspect of the invention, there is provided a software development assistant method, comprising: providing related test cases and execution tool thereof to user devices for a released software or software update related to the software, wherein the related test cases and execution tool thereof are used to test the software or the software update; collecting execution information of the test cases from user device side; and summarizing and analyzing the execution information of the test cases to derive a test case based software usage analysis result.

According to another aspect of the invention, there is provided a software development assistant method, comprising: acquiring related test cases and execution tool thereof from a software developer for a released software or software update related to the software, wherein the related test cases and execution tool thereof are used to test the software or the software update; executing the test cases by using the execution tool with respect to the software or software update; and collecting execution information of the test cases for feeding back to the software developer.

According to yet another aspect of the invention, there is provided a software development assistant system, comprising: a test case management unit configured to provide related test cases and execution tool thereof to user devices for a released software or software update related to the software, and collect execution information of the test cases from user device side, wherein the related test cases and execution tool thereof are used to test the software or the software update; and an analysis unit configured to summarize and analyze the execution information of the test cases collected from the user devices to derive a test case based software usage analysis result.

According to still another aspect of the invention, there is provided a software development assistant system, comprising: test cases and execution tool thereof related to software or software update and acquired from a software developer upon release of the software or software update related to the software, wherein the related test cases and execution tool thereof are used to test the software or the software update; and a test case management unit configured to invoke the execution tool to execute the test cases and collect execution information of the test cases for feeding back to the software developer.

According to the invention, by providing related test cases and execution tool thereof to users along with software or software update, software usage information related to the test cases may be intuitively and effectively collected from user devices, so as to facilitate a software developer effectively discover defects in its software or software update as early as possible.

BRIEF DESCRIPTION OF THE DRAWINGS

It is believed that the features, advantages, and objectives of the present invention will be better understood from the following detailed description of the embodiments of the present invention, taken in conjunction with the drawings, in which.

DETAILED DESCRIPTION OF THE INVENTION

Next, a detailed description of the preferred embodiments of the present invention will be given with reference to the drawings. Similarly, in the following description, software patch developed by a software developer for fixing its released software or software patch developed for providing new functions for the released software are all collectively referred to as software update. Generally, a computer program product for software development assistance has been provided to include a computer readable storage medium having computer readable program code embodied therewith such that the computer readable program receives from a server over a computer communications network both a software update for software installed in an end user device, and also test cases and a testing tool. The test cases are loaded in memory of the end user device and executed in the end user device with the execution tool with respect to the software update. Execution information produced by the execution of the test cases is collected and transmitted back to the server from the end user device. Optionally, a new test case for the software update can be created within the memory of the end user device the new test case can be executed along with the received test cases with the execution tool in the end user device. Consequently, the new test case can be transmitted to the server along with the collected execution information.

The First Embodiment

First, a software development assistant method and system of the first embodiment of the invention will be described.

Figure 1:
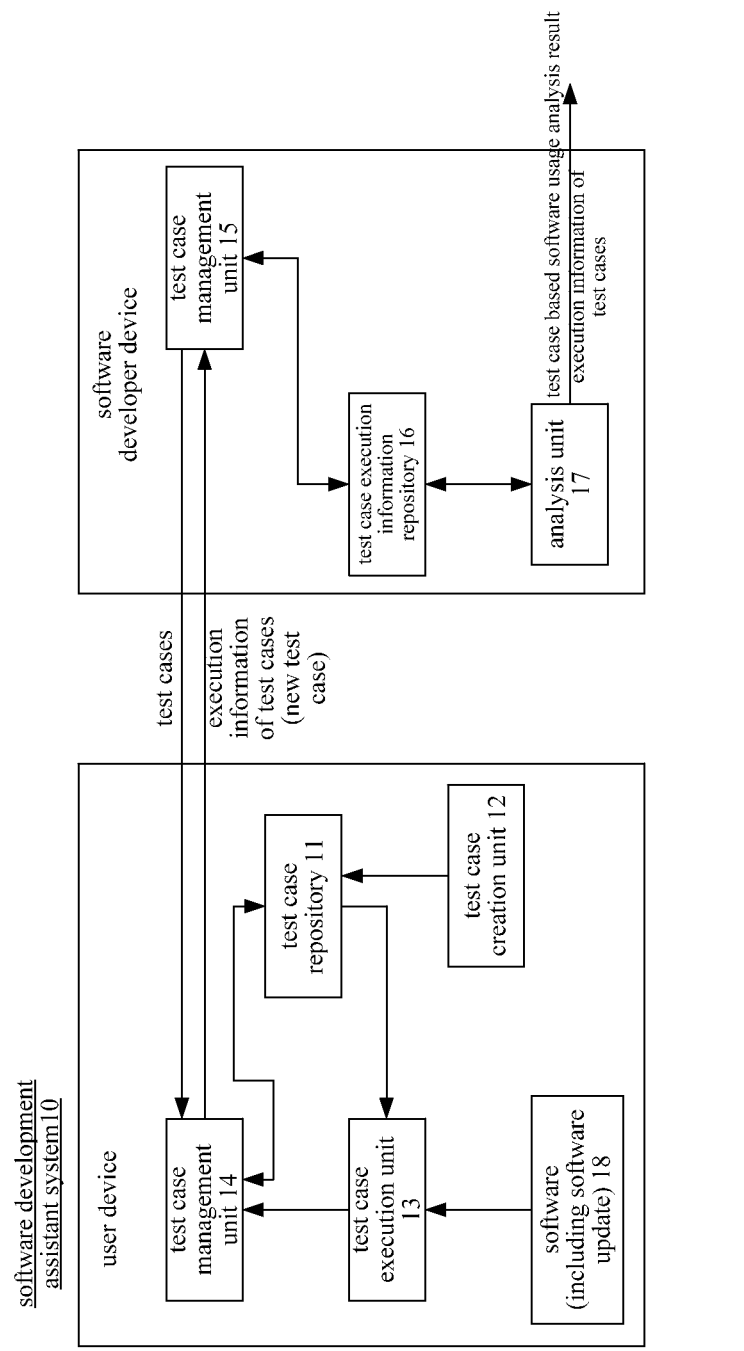
FIG. 1 is a block diagram of a software development assistant system according to the first embodiment of the invention.

FIG. 1 is a block diagram of a software development assistant system according to the first embodiment of the invention.

As shown in FIG. 1, the system 10 comprises a test case repository 11, a test case creation unit 12, a test case execution unit 13, a test case management unit 14 at user device side and a test case management unit 15, a test case execution information repository 16, an analysis unit 17 at software developer device side.

At user device side, the test case repository 11 stores therein a great number of test cases for testing functions of software 18 or software update thereof. Each of these test cases is generated by using script and represents certain function in the software 18 or software update thereof, and can be executed by an automatic execution tool to test whether the function is working properly.

Test cases in the test case repository 11 may be provided to user devices by software developer upon release of the software 18 or software update thereof. In one embodiment, these test cases are provided to user devices along with the software 18 or software update thereof, that is, these test cases are packaged with the software 18 or software update thereof. In another embodiment, these test cases are provided at a software developer site to which the user devices are accessible, and may be acquired by user based on certain criteria.

Further, test cases in the test case repository 11 may be identical to those used by the software developer in developing the software 18 or software update thereof or may be a part thereof.

The test case creation unit 12 is used to create new test cases for the software 18 or software update thereof at user device side. Here, the new test cases created by the test case creation unit 13 may also be added into the test case repository 11.

Since the test cases generated by the software developer are based on developer's own perspective, they may be limited and do not cover all the user usage environments or operation steps. With such test cases, it is possible that not every aspect of the software or software update thereof is tested by the software developer, such that undiscovered defect may remain in the software or software update thereof.

In relative, since different users will focus on different aspects in software usage, if a user can create test cases that are related to certain software functions based on his/her own demand on software usage, it will help the software developer to find defects in software or software update more easier. Therefore, for improvement on software or software update, it is very advantageous to have a test case creation unit 12 at user device side that can create test cases.

The test case creation unit 12 may be implemented by a test case creation tool released by the software developer along with the software 18 or software update thereof. The test case creation tool may either be provided to user devices along with the software 18 or software update thereof, or be provided at a software developer site to which the user devices are accessible.

Further, the test case creation tool may be same as that used by the software developer in developing the software 18 or software update thereof, or may be a simplified creation tool.

The test case execution unit 13 is configured to invoke the test cases in the test case repository 11, execute the test cases on user devices and record execution result for the software 18 or software update thereof.

Specifically, the test case execution unit 13 recognizes successes or failures of execution of the test cases, and generates a record indicating success of execution for a test case if the execution of the test case is successful, or a record indicating failure of execution of the test case if the execution of the test case failed. In addition, the failure record may comprise various information such as detailed failure representation of the test case and user's specific operation etc, such that details about failure of the test case can be specifically described.

The test case execution unit 13 may be implemented by a test case execution tool released by the software developer along with the software 18 or software update thereof. Similarly, the test case execution tool may either be provided to user devices along with the software 18 or software update thereof, or be provided at a software developer site to which the user devices are accessible.

Further, the test case execution tool may be same as that used by the software developer in developing the software 18 or software update thereof, or may be a simplified execution tool.

The test case management unit 14 invokes the test case execution unit 13 at user device side to execute the test cases in the test case repository 11, collects execution information of the test cases to feed back the information to the software developer. In addition, in case that a test case is provided by the software developer via its site, the test case management unit 14 is also responsible for downloading the test case from the site and storing it into the test case repository 11.

In addition, in case that a test case in the test case repository 11 is one newly created by the test case creation unit 12, the test case management unit 14 feeds back the newly created test case to the software developer along with its execution information.

In addition, the manner in which the test case management unit 14 feeds back the above execution information and new test cases (if any) to the software developer may be varied, it may periodically report the collected execution information and new test cases (if any), and in case that failure of execution of a test case occurs, send a notification about failure of the execution of the test case to the software developer online in real time and feed back the execution information.

In addition, the test case management unit 14 may feed back the execution information and new test cases (if any) to the software developer device directly. Alternatively, in case that the software developer collects the execution information of test cases via a test case execution information repository at its site, the test case management unit 14 periodically uploads the execution information and new test cases (if any) to the test case execution information repository.

The test case management unit 14 may be implemented by a test case management tool released by the software developer along with the software 18 or software update thereof. Similarly, the test case management tool may either be provided to user devices along with the software 18 or software update thereof, or be provided at a software developer site to which the user devices are accessible.

At software developer device side, the test case management unit 15 collects execution information of test cases and new test cases (if any) from user devices periodically or upon receiving a notification of failure of execution of a test case from a user device, and stores them into the test case execution information repository 16. In case that the software developer provides test cases to user devices via a test case repository at its site, the test case management unit 15 is also responsible for uploading the test cases of the software developer to the test case repository at the site.

The analysis unit 17 summaries and analyzes execution information in the test case execution information repository 16 to derive a test case based software usage analysis result. In specific, the analysis unit 17 reports statistics about function usage, execution result and/or function error of software through analysis, e.g. frequency that certain function is used, frequency that an error occurs in certain function etc.

Accordingly, at software developer side, a new version of software update may be developed or automatically deployed based on the software usage analysis result given by the analysis unit 17.

The above is a detailed description of the software development assistant system of FIG. 1. It should be noted that, although the test case creation unit 12 is comprised at the user device side in the system shown in FIG. 1, it can be appreciated that the test case creation unit 12 is not necessary, in actual implementation, it is also possible that the unit is not comprised at the user device side and only the test cases provided by the software developer are executed.

In addition, it should be noted that, although the system of FIG. 1 is illustrated and described by combination of user device side and software developer side, it can be appreciated that, the system part at user device side and the system part at software developer device side may be implemented and used as separate systems respectively. Therefore, in actual implementation, the system in FIG. 1 may also be divided into user side related software development assistant system (comprising the above test case repository 11, test case creation unit 12, test case execution unit 13, test case management unit 14 in FIG. 1) and software developer side related software development assistant system (comprising the above test case management unit 15, test case execution information repository 16, analysis unit 17 in FIG. 1) to be implemented respectively.

A software development assistant method of the present embodiment corresponding to the system of FIG. 1 will be described below in conjunction with FIG. 2.

Figure 2:
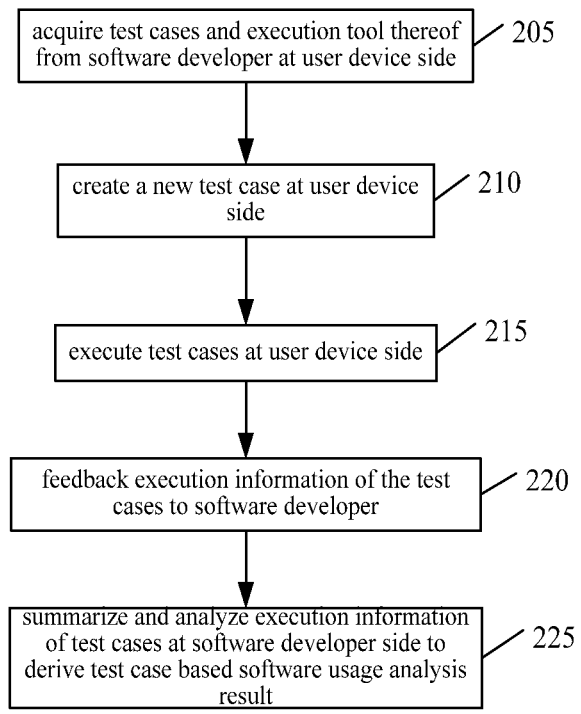
FIG. 2 is a flowchart of a software development assistant method corresponding to the system of FIG. 1.

As shown in FIG. 2, in the method, first at step 205, for the software 18 or software update related to the software 18 released by the software developer, related test cases and execution tool thereof are acquired from the software developer at user device side.

As mentioned above, related test cases and execution tool thereof may be acquired from the software developer at user device side along with the software 18 or software update thereof, or may be acquired via a software developer site to which the user devices are accessible.

Here, at user device side, the test cases acquired from the software developer are stored in the test case repository 11, and the test case execution tool provided by the software developer is installed so as to form the test case execution unit 13.

At optional step 210, new test cases are created at user device side for the software 18 or software update thereof.

This step is implemented by the test case creation tool provided by the software developer along with the software 18 or software update thereof or provided at a software developer site to which the user devices are accessible.

At step 215, the test cases in the test case repository 11 are executed at user device side by using the test case execution tool for the software 18 or software update thereof to test function of the software 18 or software update thereof.

Here, the above test cases may be those provided by the software developer or those newly created by user.

At step 220, execution information of the above test cases are collected at user device side for feeding back to the software developer.

In specific, at this step, test case execution records generated by the test case execution tool are collected. One test case execution record indicates success or failure of execution of a test case. If execution of a test case fails, the test case execution record thereof will contain more information, such as detailed failure representation of the test case and user's specific operation etc.

In addition, in case that the test case is one newly created at user device side, the new created test case will be fed back to the software developer along with execution information thereof at this step.

Further, at this step, the collected execution information of the test cases and new test cases (if any) are fed back to the software developer periodically, and in case that failure of execution of a test case occurs, a notification about failure of the execution of the test case is sent to the software developer online in real time and the execution information is fed back.

This step is implemented by a test case management tool provided by the software developer along with the software 18 or software update thereof or provided at a software developer site to which the user devices are accessible.

At step 225, the execution information of the test cases and new test cases (if any) fed back from user devices are summarized and analyzed at software developer side to derive a test case based software usage analysis result.

At this step, at software developer side, by summarizing and analyzing the execution information of the test cases and new test cases (if any), test case based software usage analysis result such as statistics about function usage, execution result and/or function error, e.g., frequency that certain function is used, frequency that an error occurs in certain function etc are acquired.

Accordingly, at software developer side, a new version of software update may be developed or automatically deployed based on the above software usage analysis result.

The above is a detailed description of the software development assistant method of FIG. 2. It should be noted that, although the method of FIG. 2 is illustrated and described by combination of user device side and software developer side, it can be appreciated that, the method steps at user device side and the method steps at software developer device side may be implemented and used as separate methods respectively. Therefore, in actual implementation, the method in FIG. 2 may also be divided into user side related software development assistant method and software developer side related software development assistant method to be implemented respectively, wherein the user side related software development assistant method comprises the above step 205, optional step 210, step 215 and 220 in FIG. 2, and the software developer side related software development assistant method comprises step 205 (here, the software developer provides related test cases and execution tool thereof to user devices), step 220 (here, the execution information of the test cases are collected from user devices) and step 225.

The software development assistant method and system of the present embodiment have been described above in conjunction with FIG. 1 and FIG. 2. By providing shared test cases and execution tool thereof to users from the software developer along with its software or software update, the embodiment enables a user to better communicate with the software developer using information generated during test in a manner that is consistent to that of the software developer, such that the software developer can intuitively and effectively collect test case based software usage information from user devices to discover defects in its software or software update as early as possible, or to better selectively and automatically deploy its newly developed software update.

The Second Embodiment

On basis of the software development assistant method and system of the first embodiment described above, a software development assistant method and system of the second embodiment of the invention will be described below.

Figure 3:
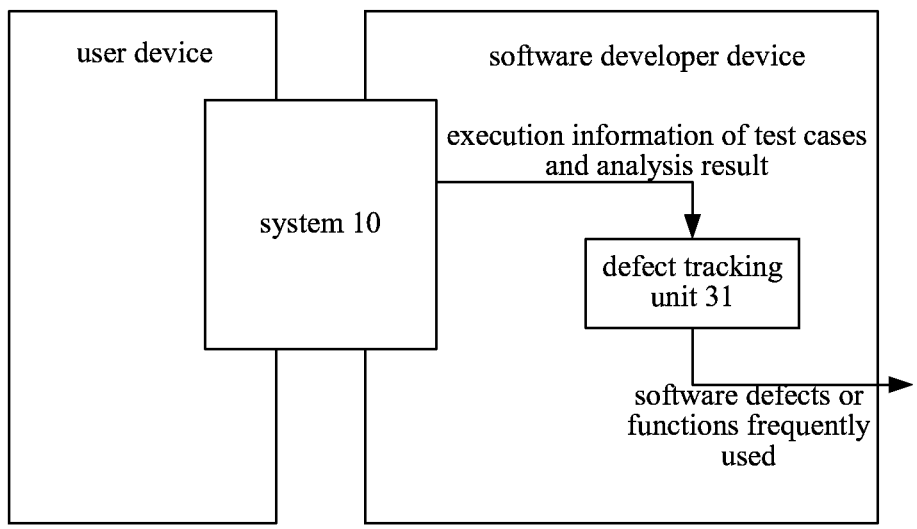
FIG. 3 is a block diagram of a software development assistant system according to the second embodiment of the invention.

FIG. 3 is a block diagram of a software development assistant system according to the second embodiment of the invention.

As shown in FIG. 3, on basis of the system 10 shown in FIG. 1, the system 30 further comprises a defect tracking unit 31 at software developer device side.

In specific, in the system 30, at software developer side, execution information of test cases and test case based software usage analysis result at user device side are acquired by using the system 10 for software 18 or software update related to that software released by the software developer.

Next, the defect tracking unit 31 at software developer device side determines defects existing or functions frequently used in the software 18 or software update thereof based on the execution information of test cases and software usage analysis result acquired by the system 10.

Accordingly, at software developer side, based on the defects or frequently used functions determined by the defect tracking unit 31, a new development direction of software update is determined to develop a new version of software update for fixing the defects existing in the software 18 or software update thereof, or to develop a new version of software update for providing new functions to enhance the functions frequently used in the software 18 or software update thereof.

The above is a detailed description of the software development assistant system of FIG. 3.

A software development assistant method of the present embodiment corresponding to the system of FIG. 3 will be described below in conjunction with FIG. 4.

Figure 4:
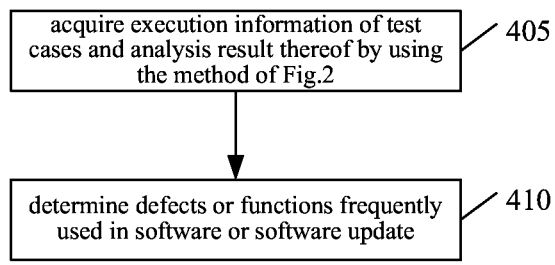
FIG. 4 is a flowchart of a software development assistant method corresponding to the system of FIG. 3.

As shown in FIG. 4, in the method, first at step 405, at software developer side, execution information of test cases and test case based software usage analysis result at user device side are acquired by using the method of FIG. 2 for software 18 or software update related to the software released by the software developer.

Next, at step 410, at software developer side, defects existing or functions frequently used in the software 18 or software update thereof are determined based on the execution information of test cases and software usage analysis result.

Accordingly, a new version of software update for fixing the defects existing or the functions frequently used in the software 18 or software update thereof is developed at software developer side.

The above is a detailed description of the software development assistant method and system of the present embodiment. By enabling the software developer to intuitively and effectively collect test case based software usage information from user devices, the embodiment can assist the software developer in discovering defects in its software or software update as early as possible and fixing the defects by developing software update. In addition, since generally there is no effective approach for the software developer to learn user's further demand and usage condition on its released software, it is hard to determine develop directions for subsequent software updates. However, the present embodiment enables the software developer to learn user's functional demands based on the execution information of shared test cases collected from user devices, thereby determining further develop directions for software updates to provide software functions that can better meet user's demand.

The Third Embodiment

On basis of the software development assistant method and system of the first embodiment and the second embodiment described above, a software development assistant method and system of the third embodiment of the invention will be described below.

Figure 5:
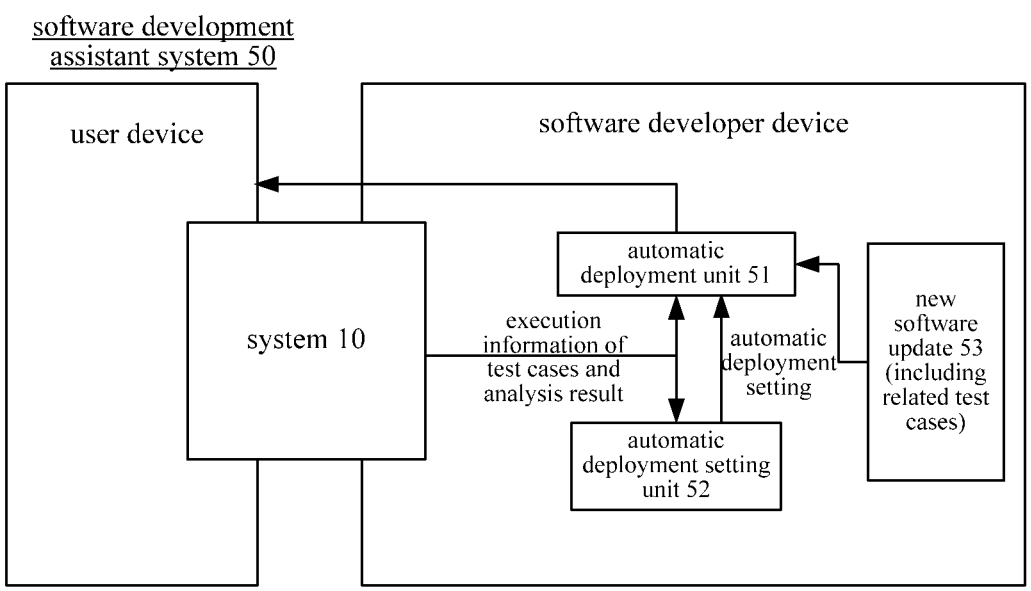
FIG. 5 is a block diagram of a software development assistant system according to the third embodiment of the invention.

FIG. 5 is a block diagram of a software development assistant system according to the third embodiment of the invention.

As shown in FIG. 5, on basis of the system 10 shown in FIG. 1, the system 50 further comprises an automatic deployment unit 51 and an automatic deployment setting unit 52 at software developer device side.

In specific, in the system 50, at software developer side, execution information of test cases and test case based software usage analysis result at user device side are acquired by using the system 10 for software 18 or software update related to that software released by the software developer.

Next, the automatic deployment unit 51 at software developer device side selectively and automatically deploys a software update 53 newly developed for the software 18 at software developer side to a portion of user devices that are closely related to function involved in that software update based on the execution information of test cases and software usage analysis result.

Here, the portion of user devices that are closely related to function involved in the new software update 53 may be those that frequently use that function or may be those where an execution failure occurs due to previously executing test cases related to that function.

In addition, the automatic deployment unit 51 also automatically deploys test cases related to the new software update 53 to the above portion of user devices along with the new software update.

Further, at software developer side, execution information of test cases related to the new software update 53 and software usage analysis result are acquired from the portion of user devices by using the system 10 periodically or upon receiving a notification of execution failure, and the automatic deployment setting unit 52 determines an automatic deployment setting for the new software update 53 based on the execution information of test cases and software usage analysis result acquired from that portion of user devices, and notifies the automatic deployment unit 51 of the automatic deployment setting.

In specific, the automatic deployment setting may comprise setting of whether to comprehensively deploy the new software update to user devices other than the user devices to which the new software update 53 has been deployed and/or setting of to which user devices the new software update will be automatically deployed etc. For example, when the automatic deployment setting unit 52 finds there is defect in the new software update 53 based on the execution information of test cases and analysis result thereof acquired from the portion of user devices, it applies an automatic deployment setting that will not comprehensively deploy the new software update for the time being, and waits the software developer to improve the software update 53. Again, for example, for user devices which are determined as those substantially didn't use the function involved in the new software update based on execution information of test cases and analysis result thereof acquired from the portion of user devices, the automatic deployment setting unit 52 applies an automatic deployment setting that will not deploy the new software update 53 to those user devices etc.

It can be appreciated that, if the software developer finds a defect existing in the new software update 53 based on the acquired execution information of test cases and analysis result thereof, it will first correct the defect before performing comprehensive automatic deployment of the new software update 53.

Accordingly, the automatic deployment unit 51 performs the automatic deployment of new software update 53 to other user devices based on setting of the automatic deployment setting unit 52.

The above is a detailed description of the software development assistant system of FIG. 5.

A software development assistant method of the present embodiment corresponding to the system of FIG. 5 will be described below in conjunction with FIG. 6.

Figure 6:
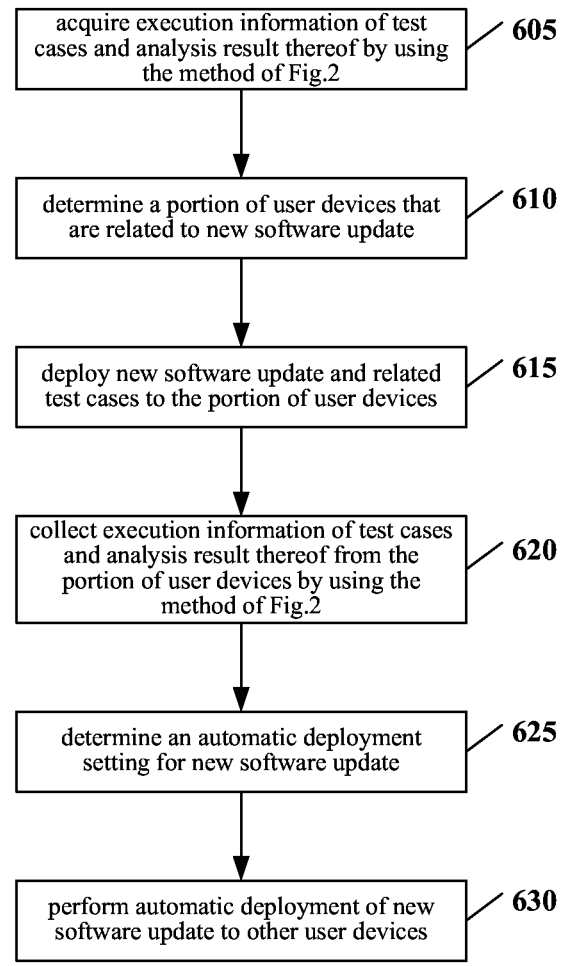
FIG. 6 is a flowchart of a software development assistant method corresponding to the system of FIG. 5.

As shown in FIG. 6, in the method, first at step 605, at software developer side, execution information of test cases and test case based software usage analysis result at user device side are acquired by using the method of FIG. 2 for the software or software update related to the software released by the software developer.

Next, at step 610, at software developer side, a portion of user devices that are closely related to function involved in software update 53 developed for the software 18 are determined based on the execution information of test cases and software usage analysis result.

At this step, user devices that frequently use the function involved in the new software update 53 or user devices where an execution failure occurs due to previously executing test cases related to that function may be determined as the portion of user devices that are closely related to function involved in the new software update 53 based on the execution information of test cases and analysis result thereof.

At step 615, at software developer side, the new software update 53 and related test cases are selectively and automatically deployed to the portion of user devices.

At step 620, at software developer side, execution information of test cases related to the new software update 53 and software usage analysis result are collected from the portion of user devices by using the method of FIG. 2.

At step 625, an automatic deployment setting is determined for the new software update 53 based on the execution information of test cases related to the new software update 53 and software usage analysis result.

At step 630, at software developer side, an automatic deployment of the new software update 53 to other user devices are performed based on the automatic deployment setting.

It can be appreciated that, at this step, if the software developer finds a defect existing in the new software update 53 based on the acquired execution information of test cases and analysis result thereof, it will first correct the defect before performing comprehensive automatic deployment of the new software update 53.

The above is a detailed description of the software development assistant method and system of the present embodiment. In the embodiment, by enabling the software developer to selectively and automatically deploy a newly developed software update to a small portion of user devices that are closely related to the function of the software update based on test case based software usage information intuitively and effectively collected from user devices to perform verification and then determine whether the software update will be comprehensively deployed according to the verification result, the case in which problems arise on a large number of user devices simultaneously due to comprehensively and automatically deploying software update can be avoided.

In addition, it should be noted that, although the software development assistant method and system of the second embodiment and the third embodiment have been described respectively, it is merely a description manner adopted for convenience of description. In actual implementation, the second embodiment and the third embodiment may be combined, that is, in the software development assistant method and system of the third embodiment, the automatically deployed software update is a new version of software update developed by using the software development assistant method and system of the second embodiment for fixing a defect or related to a frequently used function in the software 18 or software update thereof.

In addition, it should also be noted that, the above system 10 of FIG. 1, system 30 of FIG. 3, system 50 of FIG. 5 and the components thereof can be implemented with specifically designed circuits or chips or be implemented by a computer (processor) executing corresponding programs.

While the software development assistant method and system of the invention have been described in detail with some exemplary embodiments, these embodiments are not exhaustive, and those skilled in the art may make various variations and modifications within the spirit and scope of the present invention. Therefore, the present invention is not limited to these embodiments, the scope of which is only defined by appended claims.

The invention claimed is:

1. A software development assistant method, comprising:
acquiring, by an end user device, related test cases and execution tool thereof from a software developer device side for testing a function of a software at the end user device, wherein the related test cases and execution tool thereof are used to test the software on the end user device;
creating new test cases for testing the function of the software at the end user device;
executing the related test cases and the new test cases by the end user device using the execution tool with respect to the software;
collecting execution information of the related test cases and the new test cases for feeding back to the software developer device side, the execution information including the function usage information comprising a frequency that a specific function is used and a frequency that a specific error occurs for the specific function, when the specific error occurs, sending a notification about the specific error to the software developer device side online in real time and feeding back the execution information;
analyzing, at the software developer device side, the execution information of the related test cases and the new test cases collected from the user devices to derive a test case based on the collected execution information;
generating, at the software developer device side, a new version of software upon analyzing the execution information.

2. The method according to claim 1, wherein the step of creating new test cases for the software is implemented through a test case creation tool provided to the end user device by the software developer device side along with the software.

3. The method according to claim 1, wherein the execution information of the related test cases and the new test cases for feeding back to the software developer device side includes records for indicating at least one of successes and failures of execution of the related test cases and the new test cases.

4. The method according to claim 1, wherein the software further includes a software update.

5. A software development assistant system, comprising:
a test case management unit executing in memory of a software developer device side and configured to provide related test cases and an execution tool thereof to end user devices for testing a function of a software at the end user device, to collect execution information of the test cases from the end user devices, to analyze the execution information of the related test cases and new test cases collected from the user devices to derive a test case based on the collected execution information, and to generate a new version of software upon analyzing the execution information; and,
a test case management unit executing in memory of the end user device and configured to acquire the related test cases and the execution tool thereof from the software developer device, to create the new test cases for testing the function of the software at the end user device, to execute the related test cases and the new test cases using the execution tool, to collect execution information of the related test cases and the new test cases for feeding back to the software developer device side, the execution information including the function usage information comprising a frequency that a specific function is used and a frequency that a specific error occurs for the specific function, when the specific error occurs, sending a notification about the specific error to the software developer device side online in real time and feeding back the execution information.

6. The system according to claim 5, wherein the related test cases and execution tool thereof are packaged along with the software and are provided to the end user devices.

7. The system according to claim 5, wherein the related test cases and execution tool thereof are provided to the end user devices via a software developer site to which the end user devices are accessible.

8. The system according to claim 5, wherein the analysis of the execution information of the related test cases and the new test cases includes statistics about at least of one an execution result and a function error of the software.

9. The system according to claim 5, further comprising:
a defect tracking unit configured to determine at least one of a defect existing and a function frequently used in the software based on the execution information of the related test cases and the new test cases.

10. The system according to claim 9, comprising:
an automatic deployment unit configured to deploy at least one of a new software update developed for the defect existing and a function frequently used in the software selectively and automatically to a portion of the end user devices that are closely related to function involved in the new software update.

11. The system according to claim 5, wherein the software further includes a software update.

12. The system according to claim 5, further comprising an analysis unit executing in the memory of the software developer device side and configured to summarize and to analyze the execution information of the related test cases and the new test cases collected from the end user devices to derive the test case based on the collected execution information.

13. A computer program product for software development assistance, the computer program product comprising:
a computer readable hardware storage device having computer readable program code embodied therewith, the computer readable program code comprising:
computer readable program code for receiving, by an end user device, from a server over a computer communications network both software to be installed in the end user device, and also test cases and a testing tool for testing a function of a software at the end user device;
computer readable program code for creating new test cases for testing the function of the software at the end user device;
computer readable program code for loading the test cases and the new test cases in memory of the end user device and executing the test cases and the new test cases in the memory of the end user device with the execution tool with respect to the software;

computer readable program code for collecting execution information produced by the execution of the test cases and the new test cases, the execution information including function usage information comprising a frequency that a specific function is used and a frequency that a specific error occurs for the specific function;

computer readable program code for sending a notification about the specific error to the server online in real time and feeding back the execution information when the specific error occurs;

computer readable program code for analyzing, at the server, the execution information of the related test cases and the new test cases collected from the user devices to derive a test case based on the collected execution information;

generating, at the server, a new version of software upon analyzing the execution information.

14. The computer program product according to claim 13, further comprising:

computer readable program code for receiving along with the execution tool, a test case creation tool; and, computer readable program code for creating the new test case for the software with the received test case creation tool.

15. The computer program product according to claim 13, wherein the execution information of the test cases and the new test cases includes records for indicating at least one of successes and failures of execution of the test cases and the new test cases.

16. The computer program product according to claim 13, wherein the software further includes a software update.

* * * * *